No. 637,973. Patented Nov. 28, 1899.
E. P. PUTNAM & A. F. MAXFIELD.
PLOW.
(Application filed Mar. 24, 1899.)
(No Model.)
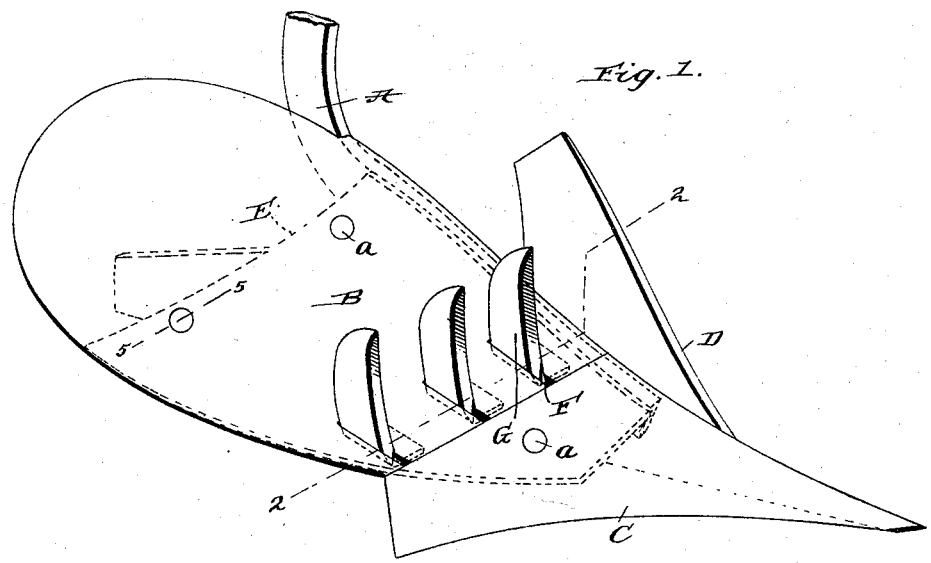
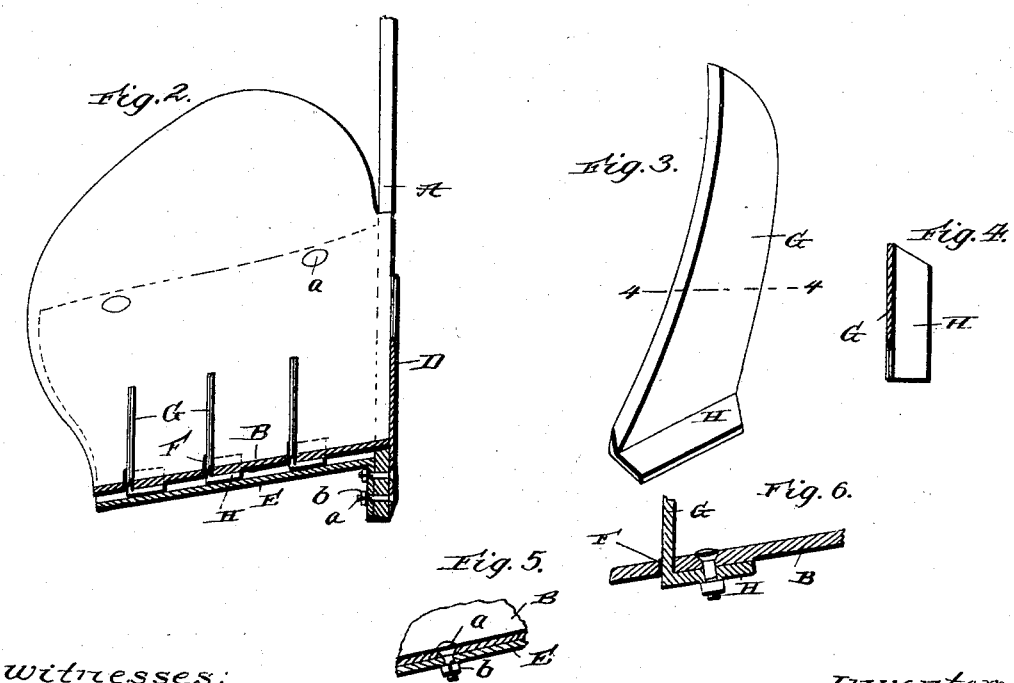

UNITED STATES PATENT OFFICE.

EMMET P. PUTNAM AND ADOLPHUS F. MAXFIELD, OF ABBEVILLE, LOUISIANA.

PLOW.

SPECIFICATION forming part of Letters Patent No. 637,973, dated November 28, 1899.

Application filed March 24, 1899. Serial No. 710,343. (No model.)

*To all whom it may concern:*

Be it known that we, EMMET P. PUTNAM and ADOLPHUS F. MAXFIELD, citizens of the United States, residing at Abbeville, in the parish of Vermilion and State of Louisiana, have invented new and useful Improvements in Plows, of which the following is a specification.

Our invention relates to plows, and contemplates the provision of a plow having a plurality of knives extending upwardly from its moldboard and disposed in one or more transverse series on the same, the said knives having for their purpose to harrow the ground as it is plowed and being strongly connected to the plow in such manner that while there is no liability of them being casually disconnected therefrom they may be readily removed for the purpose of being sharpened or when it is desired to use the plow without them and may as readily be replaced and secured in position.

With the foregoing ends in view the invention will be fully understood from the following description and claims when taken in conjunction with the annexed drawings, in which—

Figure 1 is a perspective view of a plow embodying our invention. Fig. 2 is a transverse section taken in the plane indicated by the line 2 2 of Fig. 1. Fig. 3 is a perspective view of one of the knives removed from the plow. Fig. 4 is a transverse section taken in the plane indicated by line 4 4 of Fig. 3. Fig. 5 is a detail section taken on line 5 5 of Fig. 1. Fig. 6 is a sectional detail view of a modification.

In the said drawings similar letters designate corresponding parts in all of the several views, referring to which—

A is the standard, B the moldboard, C the share, D the colter, and E the casting or brace, of what is known as a "turning-plow." The casting or brace E is disposed below the moldboard and share and in the preferred embodiment of the invention is connected to said moldboard and share and also to the standard A by bolts $a$ and nuts $b$, and hence may be readily disconnected therefrom when desired.

At its lower end and at intervals in its width the moldboard B is provided with slots F. These slots are designed for the reception of knives G, which extend upwardly from the moldboard and have for their purpose to harrow or break up the ground as it is plowed, and thereby render it unnecessary to subsequently go over the ground with a harrow. The knives are from three to six or more inches in length, according to the size of the plow, and have their forward edges sharpened and either slightly concave, as shown, or convex or straight, as desired. They are provided at their lower ends with lateral flanges H, which are interposed between the moldboard B and casting or plate E after the manner best shown in Fig. 2. By reason of this construction it will be observed that the knives are strongly and securely connected to the plow and yet may be readily removed therefrom when it is desired to use the plow without them or when it is necessary to sharpen or to replace them with new knives.

When desirable, the moldboard may be equipped with an upper additional series of knives G, which we have not deemed it necessary to illustrate. These upper knives in the preferred embodiment of the invention will be so arranged as to rest in alinement with the spaces between the knives of the lower series, whereby the ground raised by the moldboard will be finely divided.

It will also be appreciated from the foregoing that our improvements enable a plow to perform the additional function of a harrow, and yet do not appreciably increase the draft of the plow, which is an important advantage. It will also be appreciated that the improvements are very simple and inexpensive and are readily applicable to and removable from the plow for the purposes before described.

The knives G may be so arranged as to rest in a vertical position, as shown, or they may be caused to rest at a desired angle from the vertical by simply bending their flanges H to a greater or less extent.

Many plows are so constructed as to preclude the interposition of the knife-flanges H between the moldboard and a casting or plate connected thereto. For use in conjunction with such plows we provide knives having apertures in their flanges H, the said apertures being designed to receive connecting-bolts, which have heads at their outer ends countersunk in the outer side of the moldboard and nuts at their inner ends.

Having thus described our invention, what we claim is—

1. In a plow, the combination of a moldboard having an opening, a plate connected to the plow and disposed below the moldboard, and a knife arranged in the opening of the moldboard and extending upwardly therefrom; said knife having a flange interposed between the moldboard and plate, substantially as specified.

2. In a plow, the combination of a moldboard having a plurality of openings, a share, a plate detachably connected to the moldboard and share and disposed below the same, and knives arranged in the openings of the moldboard and extending upwardly therefrom and having their forward edges sharpened, said knives also having flanges interposed between the moldboard and plate, substantially as specified.

3. In a plow, the combination of the moldboard having the slots F at its forward end, the knives G formed with the lateral flange H at their lower ends to rest beneath the moldboard, and suitable means for securing the flanged portions of the knives to the moldboard, substantially as specified.

In testimony whereof we have hereunto set our hands in presence of two subscribing witnesses.

EMMET P. PUTNAM.
ADOLPHUS F. MAXFIELD.

Witnesses:
J. A. VILLIEU,
F. BROUSSARD.